Sept. 14, 1937.  E. O. ENGELS ET AL  2,092,836
APPARATUS FOR BAKING
Filed July 27, 1934

EUGENE OSCAR ENGELS
EMIL W. PLAMBECK.
INVENTORS

BY Elmer W. Vipond
ATTORNEY

Patented Sept. 14, 1937

2,092,836

UNITED STATES PATENT OFFICE 2,092,836

APPARATUS FOR BAKING

Eugene Oscar Engels and Emil W. Plambeck, Saginaw, Mich., assignors, by mesne assignments, to Baker Perkins Co. Inc., Saginaw, Mich., a corporation of New York Application July 27, 1934, Serial No. 737,194

7 Claims. (Cl. 107—43)

This invention relates to a method of and apparatus for continuously baking, and pertains particularly to the baking of certain types of baked goods, such as French bread, rye bread and buns, pretzels and certain varieties of pastries coated with an edible granular coating and baked directly on the hearth of the oven.

French and rye breads are generally coated with a layer of corn meal or certain seeds. The pretzels are coated with salt, and certain types of pastries are coated with nut meats or seeds, while other types of delicate pastries are coated with sugar and baked or dried at temperatures below the melting point of the sugar.

In the process of continuously baking such types of goods, it has been difficult to automatically coat the bottom of the goods with a coating material, and furthermore, it has been extremely difficult to produce a uniform color over the surface of the goods. It has been customary heretofore to coat the goods by conveying them through a curtain or shower of coating material; consequently, only the top portion of the goods was coated with the coating material.

Heretofore when the goods were delivered to the hearth of a continuously traveling oven the flash heat of contact between the hearth and the goods would scorch the side next to the hearth because of the temperature difference between radiated or reflected heat and the direct heat of contact. Attempts to regulate the heat of the oven to secure a uniform color over the entire surface of the goods have heretofore proved futile. If the heat was adjusted to give the proper color to the side of the goods next to the baking plates, the top surface would be too pale, and any attempts to bring out the proper color on the top side of the goods would produce a blackened area beneath the goods where they touched the hot baking hearth. To overcome this difficulty, attempts have been made to bake the goods on wire mats, rods, etc., but wherever the goods touched the wire mesh and the rods, the flash heat of contact would burn dark spots.

The present invention relates to 'a simple method and apparatus for overcoming the above objections, and it is therefore our object to provide a method of and apparatus for continuously baking food products which consists in covering the traveling hearth of a continuous baking oven with a layer of granular coating material, continuously depositing a layer of granular coating material on the top surface of the goods and then depositing the partially coated goods upon the layer of coating material on the traveling baking hearth, thereby supporting the goods on the coating material and preventing the flash heat of connection from scorching the bottoms of the goods. The only point of contact between the hot baking plates and the goods is through the coating material, and as the point is so minute, the balance of the surface of the goods is baked by radiant heat. In most instances the coating material acts as an insulation, therefore, the goods are of uniform color over their entire surface; furthermore, any spots which may be scorched by the flash heat of contact between the coating material and the goods, are at the point where the coating material adheres to the goods and are thus hidden.

With these and certain other objects in view which will appear later in the specification, our invention comprises the devices and method described and claimed, and the equivalents thereof.

Referring now to the drawing, which is more or less diagrammatic, and shows an illustrative embodiment of our invention, Figure 1 represents a longitudinal section through the feed end of a bake oven.

Figure 6:
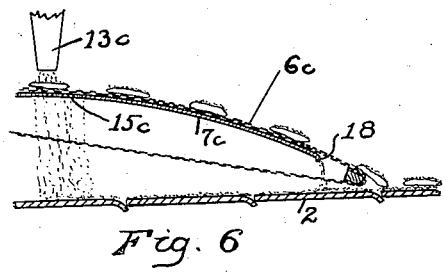
Figures 5 and 6 are still further modified forms of construction.

Our invention comprises the usual traveling oven (1) having a series of baking plates (2) supported by rollers (3) traveling over the usual track (4) and drive sprocket (5).

Extending across the feed end of the oven is the usual feeding device, which may be of any type, but as shown in the drawing may consist of a feeding belt (6) comprising a continuous run of upper and lower laps of wire mesh supported by upper and lower supporting plates (7 and 8). The feed end of the belt travels over a roller or bar (9), appropriately supported above the baking hearth. The opposite end of the feeding belt is driven by a shaft (10) which in turn is rotated by a drive sprocket (11) driven by the oven driving mechanism (12), or if preferred, by an individual drive.

The goods are delivered to the feeding device in any known manner, such as depositing them by hand or automatically from the conveyors of forming machines. The goods are then passed beneath a sifter (13) or other device for feeding the granular coating material.

Figure 1:
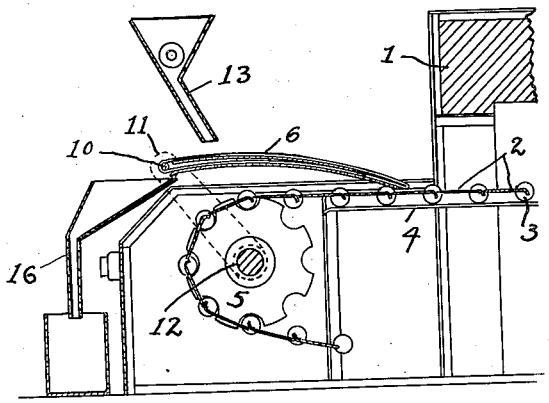
Figure 2:
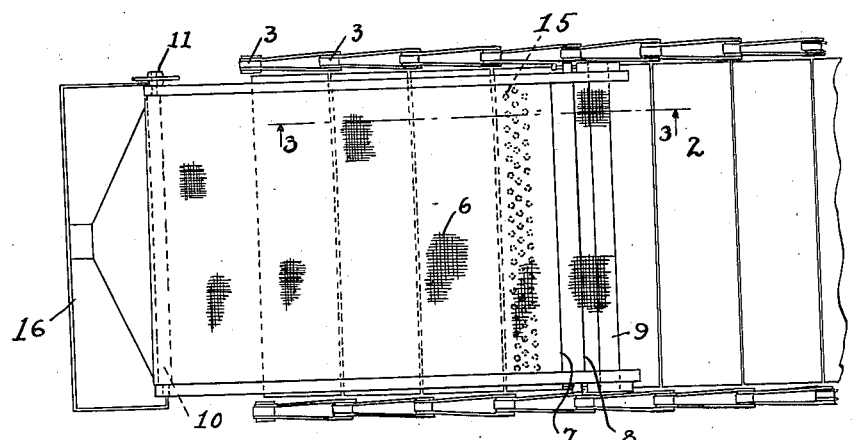
Figure 2 is an enlarged top plan view of the feed end of a continuously traveling baking hearth and a typical feeding device.
Figure 3:
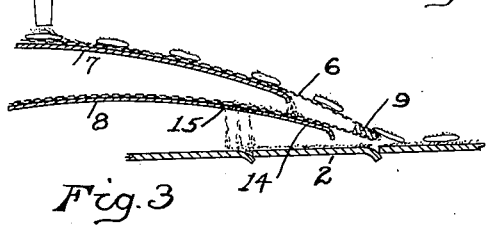
Figure 3 is an enlarged cross section on line 3—3 of Fig. 2.

In the illustrative embodiment shown in Figures 1, 2 and 3, the sifter (13) feeds slightly more material than is necessary to coat the goods. Such material which does not adhere to the moist surface of the goods falls through the mesh of the wire conveyor (6) onto the upper supporting plate (7) and is thus conveyed in the interstices between the meshes to the end of the top supporting plate (7), from whence it is delivered to the forwardly projecting end (14) of the lower conveyor supporting plate (8). The granular coating material is caught in the meshes of the return lap of the feeding conveyor and is then conveyed rearwardly by the interstices over the top of the lower supporting plate (8).

At an appropriate distance from the end (14) of the lower supporting plate there are provided a series of perforations (15) of a size sufficient to allow the correct amount of coating material to pass through. The wire mesh conveyor carrying, in its interstices the particles of coating material, deposits through these perforations (15) just sufficient coating material to cover the baking plates. Then, when the goods are deposited from the delivery end of the feeding conveyor they will be entirely supported upon the granular coating material and passed through the oven for baking. Any excess material which is not delivered through the holes (15) in the lower plate (8) is returned to the end of the oven and deposited in a receptacle (16) provided for the surplus material.

Figure 4:
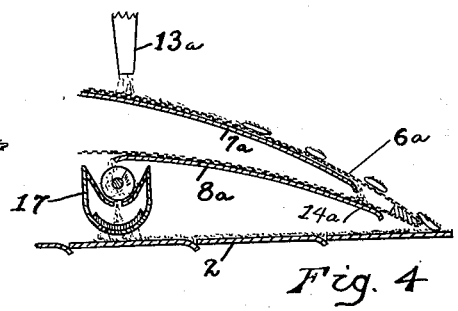
Figure 4 is a view similar to Fig. 3, showing a modified form of construction.

Figure 4 is a modified form of construction which comprises the usual delivery belt (6a), but instead of depositing the material through holes in the lower supporting plate, the coating material is returned to a sifting device (17) located beneath the rear end of the lower supporting plate (8a) and spread upon the baking plates by the usual mechanically agitated sifter. Conceivably, instead of the lower plate returning the surplus material to the sifting device, the sifting device could be fed from an independent source of coating material, the surplus from the upper plate being returned to a catch receptacle. Such an arrangement is applicable for pastries which may be coated on top with one colored sugar and on the bottom with a different colored sugar, or for French and rye breads where the top of the loaf may be coated with poppy or caraway seeds, and the bottom is coated with cornmeal.

Figure 5:
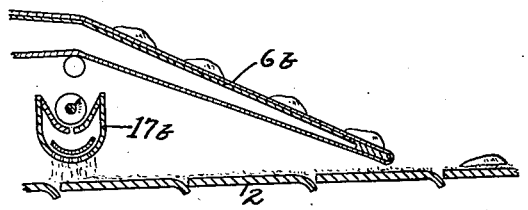

Figure 5 is a further modified form of our invention, used where it is desired to coat only the bottoms of certain types of bread and pastries.

In the device shown in Figure 5, the usual mechanical sifter (17b) deposits the coating material on the baking hearth, and the goods are deposited on the coating material on the baking hearth by the usual feeding conveyor on panner blade (6b).

According to the modified form of construction shown in Figure 6, the feeding conveyor (6c) is supported only on its upper run by a supporting plate (7c). In this construction, perforations (15c) are provided in the supporting plate (7c) adjacent to the hopper or spout (13c) of the granular coating material distributor. The surplus coating material which does not adhere to the food products falls through the perforations (15c) onto the baking hearth (2). Such coating material which is not deposited through the perforations (15c) is carried in the interstices of the conveyor and deposited onto the baking hearth over the end (18) of the supporting plate, thus providing a layer of coating material on the hearth to support the food products during the baking process.

By the above described means we have invented a simple automatic device for coating and baking certain types of baked goods which will insure a uniform coating of granular material, and by supporting the goods on a layer of the coating material, will insure a uniform color over the entire area by baking entirely by radiated heat.

While we have shown and described several illustrative forms of our invention, it is understood that certain changes, modifications and substitutions of parts may be made without departing from the spirit of our invention.

Having thus described our invention, what we claim and desire to secure by Letters Patent is:

1. In combination, an oven having a traveling baking hearth, a feeder for feeding food products to said hearth, said feeder comprising a continuous foraminous conveyor, supporting plates beneath the upper and return runs of said conveyor, sifting means for depositing granular coating material on the food products carried by the upper run of said foraminous conveyor, the surplus coating material being collected in the interstices of said foraminous conveyor on the upper supporting plate and delivered by the interstices to the supporting plate beneath the lower run of the foraminous conveyor, and means associated with the said lower supporting plate for depositing the coating material on the baking hearth whereby the food products are supported by the coating material during the baking process.

2. In combination, an oven having a traveling baking hearth, a feeder for feeding food products to said hearth, said feeder comprising a continuous foraminous conveyor, a supporting plate beneath one run of said conveyor, depositing means for depositing granular coating material on the food products carried by the upper run of said foraminous conveyor, the surplus coating material being collected in the interstices of said foraminous conveyor on the supporting plate, and independent means associated with the said supporting plate for uniformly depositing the coating material on the baking hearth whereby the food products are supported entirely on coating material during the baking process.

3. In combination, an oven having a traveling baking hearth, a feeder for feeding food products to said hearth, said feeder comprising a continuous foraminous conveyor, a supporting plate beneath one run of said conveyor, said supporting plate having perforations therein, depositing means for depositing granular coating material on the food products carried by the upper run of said foraminous conveyor, the surplus coating material being carried by the interstices of said foraminous conveyor on the supporting plate and deposited through the said perforations onto the baking hearth whereby the food products are supported on the coating material during the baking process.

4. In combination, an oven having a traveling hearth, a feeder for feeding food products to said hearth, depositing means for depositing granular coating material on said food products and means independent of said depositing means, for uniformly depositing granular coating material on said hearth whereby the food products are positively supported by the granular coating material on said hearth during the baking process.

5. In a salting mechanism for pretzel forms, a reticulated conveyor having upper and lower flights, a salt hopper above the conveyor and having an outlet member provided with an outlet portion to discharge salt onto pretzel forms carried by the conveyor, a plate immediately below the upper flight of the conveyor in supporting relation thereto and being in the path of descent of salt, and a supporting member beneath the lower flight of the conveyor in receptive relation to salt discharged from said plate to receive the salt therefrom and being provided with a plurality of passages for salt to feed salt to a pretzel support.

6. In a mechanism for speckling food with granular material, a conveyor for food and having reticulations for the free passage of granular material, a feeding unit for granular material and having an outlet in feeding relation to the food on said conveyor, a rebound member in the path of flight of said granular material and having means to deflect the flight of such material into contact with the food, and a plate in receptive relation to granular material discharged from said rebound member and having means to feed such granular material to a moving oven hearth.

7. In a mechanism for coating food forms on both sides thereof, a conveyor for food forms and having food receiving and discharge portions, a feeding unit for granular material in feeding relation to said conveyor and to the upper sides of the food forms thereon, a second conveyor in receptive relation to the discharge portion of said first-named conveyor to receive food forms therefrom, and a member associated with said first-named conveyor and being in receptive relation to coating material from said conveyor, said member having means associated therewith to furnish coating material to said second conveyor at a point rearward of the discharge portion of the first conveyor with reference to the line of travel of the second conveyor so that when the food forms are transferred from the first to the second conveyor, the same will be deposited on a previously coated portion of the second conveyor and thus coated on the under side thereof.

EUGENE OSCAR ENGELS.
EMIL W. PLAMBECK.